(12) United States Patent
Walker

(10) Patent No.: US 10,637,942 B1
(45) Date of Patent: Apr. 28, 2020

(54) PROVIDING MOST RECENT APPLICATION VIEWS FROM USER DEVICES

(71) Applicant: Citrix Systems, Inc., Fort Lauderdale, FL (US)

(72) Inventor: James Robert Walker, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/210,484

(22) Filed: Dec. 5, 2018

(51) Int. Cl.
| | |
|---|---|
| H04L 29/08 | (2006.01) |
| H04M 1/725 | (2006.01) |
| G06F 9/451 | (2018.01) |
| G06F 9/54 | (2006.01) |

(52) U.S. Cl.
CPC .............. H04L 67/22 (2013.01); G06F 9/451 (2018.02); G06F 9/54 (2013.01); H04M 1/72586 (2013.01)

(58) Field of Classification Search
CPC combination set(s) only.
See application file for complete search history.

(56) References Cited

U.S. PATENT DOCUMENTS

| | | |
|---|---|---|
| 2004/0081951 A1 | 4/2004 | Vigue et al. |
| 2004/0095378 A1 | 5/2004 | Vigue et al. |
| 2006/0161889 A1 | 7/2006 | Stabb et al. |
| 2014/0164966 A1 | 6/2014 | Kim et al. |
| 2014/0184471 A1 | 7/2014 | Martynov et al. |
| 2015/0169146 A1 | 6/2015 | Lalwani |
| 2016/0124532 A1 | 5/2016 | Wolff et al. |
| 2016/0259497 A1* | 9/2016 | Foss ..................... G06F 3/0482 |
| 2017/0357973 A1 | 12/2017 | Van Os et al. |
| 2018/0059893 A1 | 3/2018 | Xu et al. |
| 2018/0157411 A1 | 6/2018 | Kim et al. |
| 2018/0335921 A1 | 11/2018 | Karunamuni et al. |
| 2018/0335939 A1 | 11/2018 | Karunamuni et al. |

FOREIGN PATENT DOCUMENTS

EP  2367113  9/2011

OTHER PUBLICATIONS

International Search Report and the Written Opinion of the International Searching Authority, International Application No. PCT/US2019/062142, dated Feb. 20, 2020.

\* cited by examiner

*Primary Examiner* — El Hadji M Sall
(74) *Attorney, Agent, or Firm* — BainwoodHuang

(57) ABSTRACT

A last task view is captured for an application executing on a user device, in response to detecting that the user has stopped using the application. The user device may be a mobile device, and the application executing on the user device may be a native application. The last task view may be an image of the contents of a user interface displayed on the user device by the application when the user stopped using the application, and is transmitted from the user device to a server computer for storage in a repository storing views of applications most recently used by the user. A viewer application executing on the server computer may then display the views of applications most recently used by the user to the user on a user device other than the user device on which the last task view was captured.

18 Claims, 6 Drawing Sheets

PROVIDING MOST RECENT APPLICATION VIEWS FROM USER DEVICES

TECHNICAL FIELD

The present disclosure relates generally to technology for providing views of a user's most recently used applications, and more specifically to technology for providing views of the user interface displayed by one or more recently used applications executing on one or more user devices other than a user device that is used to display the views.

BACKGROUND

As it is generally known, it is sometimes desirable for a user of information technology to access views of the applications that they recently used. For example, a user may stop using one or more applications at one point in time (e.g. due to being interrupted by a high priority task), and then at a later point in time (e.g. when the interruption is over) resume working on the task that they were working on at the time of the interruption. Under such circumstances, it is often useful for the user to view the contents of the user interfaces of the application or applications that they were previously using, as the user interfaces appeared at the time when the user was interrupted.

Various use cases illustrate the value of providing views of recently used applications. In some cases, the contents of a recently used application's user interface may be useful to the user so that the user can avoid needlessly performing previously completed tasks. For example, a view of a recently used application's user interface may indicate that specific user data was previously entered, thus enabling the user to avoid re-entering previously entered information, and/or to review and/or reuse the data that was previously entered. Similarly, a view of a recently used application's user interface may include results output from the application resulting from the application being used to perform a previously completed task. In another example, the user may be using an application to read a document at the time they are interrupted, and a view of the user interface of the application at the time of the interruption may indicate the specific place in the document at which the user was last reading, thus enabling the user to later resume reading of the document from the correct point within the document, either using the same application or a different application. Those skilled in the art will recognize that the preceding examples are not exhaustive, and that many other examples exist of the usefulness of providing views of recently used applications, involving other specific use cases, reflecting the operation of specific applications, and/or depending on the specific task or tasks being performed by the user.

SUMMARY

Modern information technology users often use multiple different computing devices for their work and/or personal computing needs, and frequently move from one computing device to another. Under these circumstances, it becomes increasingly desirable for the user to be able to obtain views of one or more recently used applications that from one or more computing devices other than the computing device they are currently using. Previous technology for providing views of recently used applications has had shortcomings with regard to providing views of recently used applications when the applications are run on computing devices other than the computing device that the user is currently using, particularly when the other computing devices include a mobile device such as a smartphone or tablet.

For example, some previous computing systems allow the user only to view applications that were recently executed on the computing device that they are currently using. In this regard, some existing mobile computing devices allow the user to display views of recently executed applications on the mobile device through a button press or button press combination. For example, double-tapping on the "Home" button of certain iPhone® smartphones made by Apple Inc. enables the user of the mobile device to view applications recently used on the smartphone, and smartphones using the Android™ operating system developed by Google LLC will display applications recently executed on the smartphone when the user taps on a recent apps icon. However, such views of recent applications executed on a smartphone mobile device do not provide views of recently used applications that executed on other computing devices, and are themselves not available to the user when the user is using another computing device.

Some previous virtual workspaces have provided views of recently used applications that are remotely hosted, and that are accessed through the virtual workspace, e.g. using a client program, such as a browser or workspace client. With these systems, the user can move from one computing device to another and obtain views of the applications that were recently accessed through the virtual workspace. However, for purposes of performance, applications that execute on mobile devices are often designed as "native" applications that execute directly on the hardware of the mobile device on which they used, and accordingly cannot be provided to the user through previous virtual workspace applications. Since previous virtual workspace applications only provide recent application views of hosted applications that are provided through the virtual workspace application, they do not provide views of native applications that were recently used by the user and executed directly on the user's mobile device(s).

In order to address the above described and other shortcomings of previous technology, new technology is described herein for providing views of applications most recently used by a user. In the disclosed technology, in response to detecting that the user has stopped using an application executing on a user device, a last task view is captured for the application executing on the user device. The last task view for the application executing on the user device includes the contents of a user interface displayed on the user device by the application executing on the user device when the user stopped using the application executing on the user device. The last task view for the application executing on the user device is transmitted from the user device to a server (e.g. a virtual workspace server), and stored into a most recent application views repository located in the server.

Views of applications most recently used by the user, including the last task view for the application executing on the user device, are output from the most recent application views repository to a viewer application executing on the server. The viewer application executing on the server then displays the views of the applications that were most recently used by the user to the user.

In some embodiments, the user device may be a mobile device, and the application executing on the user device may be a native application executing on the mobile device. The last task view of the application executing on the user device may be an image captured of the user interface displayed on a display device of the mobile device by the native application executing on the mobile device when the user stopped using the native application executing on the mobile device.

In some embodiments, displaying, by the viewer application executing on the server, the views of applications most recently used by the user to the user, may further include transmitting the views of applications most recently used by the user from the server to a user device other than the mobile device, and displaying the views of applications most recently used by the user in a user interface displayed in a display device of the user device other than the mobile device.

In some embodiments, detecting that the user has stopped using the application executing on the user device may include or consist of detecting that the user interface of the application executing on the user device has been moved to a background of a graphical user interface displayed in a display device of the user device. The last task view for the application executing on the user device may include or consist of contents of the user interface displayed by the application executing on the user device when the user interface of the application executing on the user device was moved to the background of the graphical user interface displayed in the display device of the user device.

In some embodiments, detecting that the user has stopped using the application executing on the user device may include or consist of detecting that the application executing on the user device has been closed. The last task view for the application executing on the user device may include or consist of contents of the user interface displayed by the application executing on the user device when the application executing on the user device was closed.

In some embodiments, further in response to detecting that the user has stopped using the application executing on the user device, metadata corresponding to the last task view for the application executing on the user device may also be captured. The metadata corresponding to the last task view for the application executing on the user device may be transmitted from the user device to the server. The metadata corresponding to the last task view for the application executing on the user device may be stored in the most recent application views repository in the server, and output from the most recent application views repository in the server to the viewer application executing on the server. Various specific types of metadata corresponding to the last task view for the application executing on the user device may be captured and transmitted from the user device to the server. Examples of such metadata may include, without limitation, metadata identifying the application executing on the user device, metadata indicating a time at which the application executing on the user device was most recently used, metadata identifying the user device, and/or various other metadata related to the corresponding last task view.

In some embodiments, the viewer application executing on the server may display the views of applications most recently used by the user together with the metadata corresponding to the last task view for the application executing on the user device.

In some embodiments, the most recent application views repository may store metadata corresponding to each one of the views of applications most recently used by the user. The viewer application executing on the server may display the views of applications most recently used by the user by organizing the views of applications most recently used by the user according to the metadata corresponding to each of the views of applications most recently used by the user. The views of applications most recently used by the user may then be displayed as organized according to the metadata corresponding to each of the views of applications most recently used by the user.

In some embodiments, displaying the views of applications most recently used by the user may further include detecting user selection of one of the views of applications most recently used by the user and displaying a larger version of the selected one of the views of applications most recently used by the user.

In some embodiments, multiple last task views may be captured on the user device. Each one of the last task views captured on the user device may include or consist of contents of a user interface of a corresponding application executing on the user device when the user stopped using the corresponding application. The multiple last task views captured on the user device may be transmitted together as a group from the user device to the server. The views of applications most recently used by the user may accordingly include the multiple last task views captured on the user device.

In some embodiments, the views of applications most recently used by the user may further include at least one last task view captured on a desktop computer. The last task view captured on the desktop computer may include or consist of the contents of a user interface displayed by an application executing on the desktop computer, and have been captured when the user stopped using the application executing on the desktop computer.

In some embodiments, the views of applications most recently used by the user may further include at least one last task view including contents of a user interface of a remotely hosted application executing at least in part on a host server, that was captured when the used stopped using the remotely hosted application. Displaying the views of applications most recently used by the user further may further include detecting user selection of the last task view including contents of the user interface of the remotely hosted application captured when the used stopped using the remotely hosted application, and in response to detecting user selection of the last task view including contents of the user interface of the remotely hosted application captured when the used stopped using the remotely hosted application, resuming execution of the remotely hosted application on the host server.

In some embodiments, the server is a virtual workspace server, and a virtual workspace application executes on the virtual workspace server, and provides a virtual workspace to the user. The viewer application executing on the virtual workspace server may be accessed by the user through the virtual workspace application.

Embodiments of the technology described herein may provide significant improvements over previous solutions. For example, embodiments of the disclosed technology may enable the user to obtain views of one or more recently used applications that execute on a computing device other than the computing device currently being used, including views of recently used applications that run on another computing device that is a mobile device such as a smartphone or tablet. Such recently used applications may include "native" applications that execute directly on the hardware of the mobile device on which they used.

BRIEF DESCRIPTION OF THE DRAWINGS

The foregoing and other objects, features and advantages will be apparent from the following description of particular embodiments, as illustrated in the accompanying drawings in which like reference characters refer to the same parts throughout the different figures. The elements of the drawings are not necessarily drawn to scale, emphasis instead being placed upon illustrating the principles of the various embodiments.

DETAILED DESCRIPTION

Embodiments will now be described with reference to the figures. Such embodiments are provided only by way of example and for purposes of illustration. The scope of the claims is not limited to the examples of specific embodiments shown in the figures and/or otherwise described herein.

The individual features of the particular embodiments, examples, and implementations described herein can be combined in any manner that makes technological sense. Such features are hereby combined to form all possible combinations, permutations and/or variations except to the extent that such combinations, permutations and/or variations have been expressly excluded herein and/or are technically impractical. Support for all such combinations, permutations and/or variations is considered to exist in this document.

As described herein, a last task view is captured for an application executing on a user device in response to detecting that the user has stopped using the application. The last task view for the application executing on the user device includes the contents of a user interface that is being displayed on the user device by the application executing on the user device when the user stopped using the application executing on the user device. The last task view for the application executing on the user device is transmitted from the user device to a virtual workspace server, and stored into a most recent application views repository located in the virtual workspace server. Views of applications most recently used by the user, including the last task view for the application executing on the user device, are output from the most recent application views repository to a viewer application executing on the virtual workspace server. The viewer application displays the views of applications most recently used by the user to the user.

Figure 1:
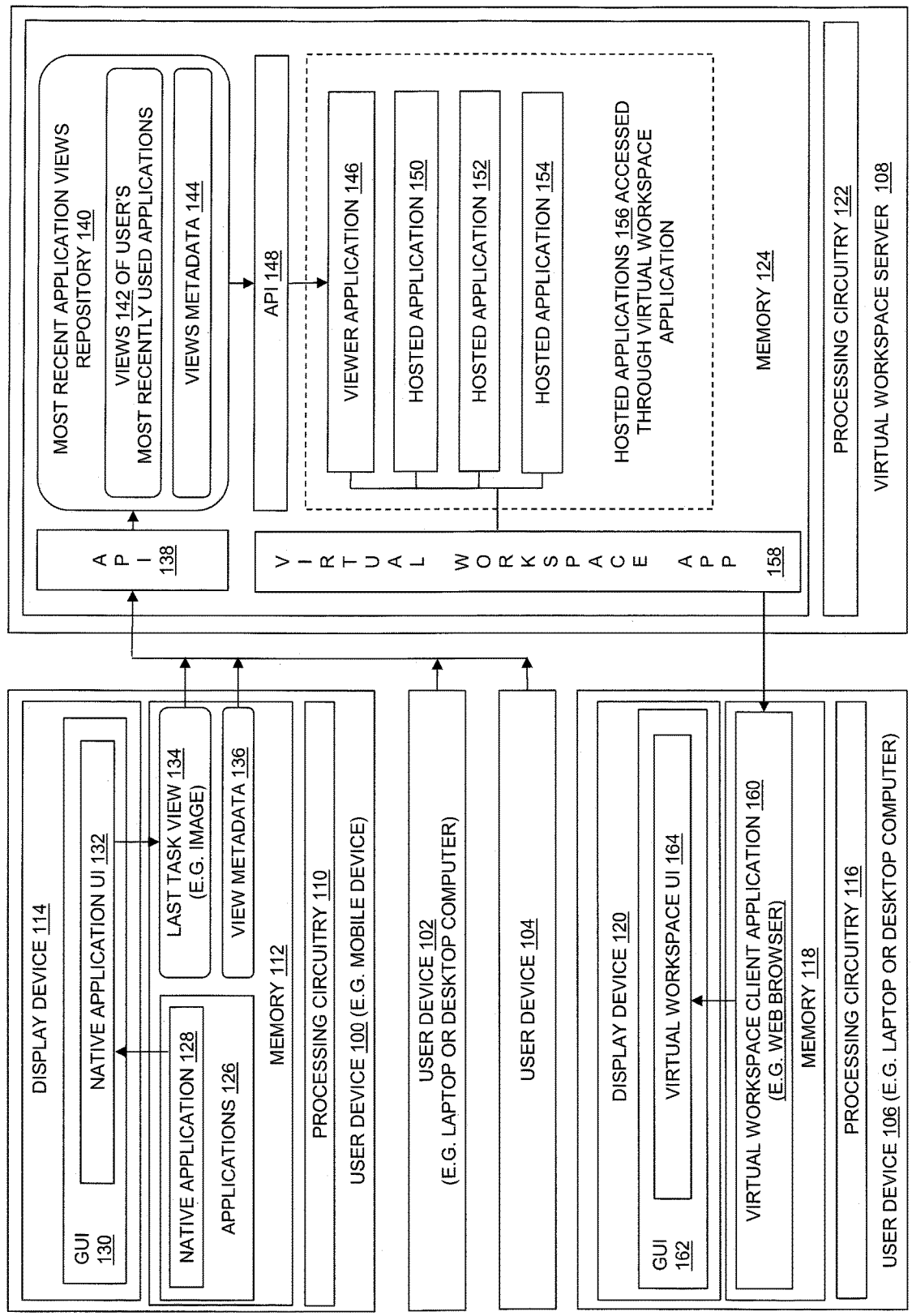
FIG. 1 is a block diagram showing a first example of components in some embodiments of the disclosed technology for providing views of applications most recently used by a user.

FIG. 1 is a block diagram showing a first example of components in some embodiments of the disclosed technology for providing views of applications most recently used by a user. As shown in FIG. 1, multiple user devices may be used by a user, and are shown for purposes of explanation by User Device 100, User Device 102, User Device 104, and User Device 106. For example, User Device 100 may be a mobile device, such as a smartphone, tablet computer, e-book reader, or some other type of mobile computing device belonging to the user. User Device 102 and User Device 106 may each be a laptop or desktop computer. User Device 104 may be any specific type of user device.

Each one of the user devices shown in FIG. 1 includes processing circuitry, which may include or consist of one or more Central Processing Units (CPUs) and associated hardware circuitry that is operable to execute the program code of applications and an operating system that are stored in a memory of the user device. For example, User Device 100 is shown including Processing Circuitry 110, and User Device 106 is shown including Processing Circuitry 116.

Each one of the user devices shown in FIG. 1 further includes memory, which may include or consist of some combination of Random Access Memory (RAM) and Read Only Memory (ROM), and which is used i) to store program code executable on the processing circuitry of the user device, and ii) to store data generated by and/or accessed by such program code. For example, User Device 100 is shown including Memory 112, and User Device 106 is shown including Memory 118. The program code stored in the memory of each user device may include one or more applications, and an operating system.

For example, Applications 126 stored in Memory 112 and executing on the Processing Circuitry 110 in User Device 100 are shown including a Native Application 128. Native Application 128 may be an application that is native to the Mobile Device 100, i.e. an application that is specifically designed to execute locally on mobile devices that include the specific operating system that is being executed on Mobile Device 100. As it is generally known, by executing locally on the mobile device, a native application such as Native Application 128 can operate without high levels of mobile device transmitter use, and can therefore provide high levels of performance and low battery utilization. For example, some embodiments of Native Application 128 may be specifically designed to execute locally on mobile devices that run Apple's iOS® operating system. In another example, some embodiments of Native Application 128 may be specifically designed to execute locally on mobile devices that run Google's Android™ operating system. Still other example embodiments of Native Application 128 may be specifically designed to execute locally on mobile devices that run various other operating systems. Because Native Application 128 is a native application for User Device 100, User Device 100 is a mobile device that runs the specific operating system that Native Application 128 was specifically designed to execute with. In addition, because Native Application 128 is a native application for Mobile Device 100, Native Application 128 executes locally on Mobile Device 100, by executing directly on the Processing Circuitry 110 of User Device 100.

In another example, also shown in FIG. 1, applications executing on the Processing Circuitry 116 of User Device 106 may include a Virtual Workspace Client Application 160 stored in Memory 118. In some embodiments, Virtual Workspace Client Application 160 may be embodied as a Web browser. Alternatively, Virtual Workspace Application 160 may be embodied as a dedicated workspace client application executing on Processing Circuitry 116 of User Device 106, and corresponding to Virtual Workspace Application 158.

Each one of the user devices shown in FIG. 1 further includes a display device that includes or consists of an electronic visual display. In some embodiments, a touch screen input device may be layered on top of the user device's electronic visual display. For example, User Device 100 is shown including Display Device 114, and User Device 106 is shown including Display Device 120.

The display device of each one of the user devices shown in FIG. 1 displays a graphical user interface including or consisting of one or more user interfaces generated by one or more corresponding applications executing in the user device. For example, Display Device 114 displays GUI 130, which may include a Native Application UI 132 that is generated by Native Application 128, and Display Device 120 displays GUI 162, which may include a Virtual Workspace UI 164 that is generated by Virtual Workspace Client Application 160.

Those skilled in the art will recognize that each one of the user devices may further include other software components, hardware components, devices, and associated circuitry in addition to those shown in FIG. 1. For example, User Device 100 may be a mobile device such as a smartphone, and may therefore additionally include smartphone devices such as a camera, microphone, speaker, etc.

The components shown in the example of FIG. 1 also include a Virtual Workspace Server 108. Virtual Workspace Server 108 is separate from and operates independently with regard to user devices 100, 102, 104, and 106. Communications are provided between Virtual Workspace Server 108 and each one of the user devices 100, 102, 104, and 106, over one or more computer and/or data communication networks, e.g. LANs, WANs, etc. Virtual Workspace Server 108 may be made up of one or more physical server computers, and/or one or more virtual machines executing on such physical server computers via a hypervisor. Virtual Workspace Server 108 includes Processing Circuitry 122, which may include or consist of one or more Central Processing Units (CPUs) and associated hardware circuitry that is operable to execute the program code of one or more applications and an operating system that are both stored in the Memory 124. Memory 124 is made up of some combination of Random Access Memory (RAM) and Read Only Memory (ROM), and may be used i) to store program code executable Processing Circuitry 122, and ii) to store data generated by and/or accessed by such program code. The program code stored in Memory 124 and executable on Processing Circuitry 122 may include applications and an operating system. For example, Memory 124 stores Hosted Applications 156 that are accessed by the user through the Virtual Workspace Application 158. Each application in Hosted Applications 156 may include any specific type of application. The Hosted Applications 156 provided to the user may include or consist of one or more virtual desktops or the like, and/or one or more virtualized applications. In the illustrative example of FIG. 1, Hosted Applications 156 are shown including a Viewer Application 146, Hosted Application 150, Hosted Application 152, and Hosted Application 154.

In some embodiments, Virtual Workspace Application 158 may manage authentication of the user prior to providing the user with access to any of Hosted Applications 156, and/or may be responsible for controlling the user's access to specific applications and/or features of applications within Hosted Applications 156 based on a set of pre-defined authorizations granted to the user. In some embodiments, Virtual Workspace Application 158 may operate as a server in a client/server distributed application relationship with a client that is provided by Virtual Workspace Client Application 160, and the user may access any of the Hosted Applications 156 through the Virtual Workspace UI 164 that is generated by Virtual Workspace Client Application 160.

A Most Recent Application Views Repository 140 stores Views 142. Views 142 are images of the user interfaces of the applications that the user most recently used, e.g. images of the user interfaces of some pre-configured number of most recently used applications. Each view in Views 142 was captured at the time the user last used the corresponding most recently used application, e.g. in response to detecting that the user was no longer using the application. Most Recent Application Views Repository 140 may also be embodied to store Views Metadata 144, which is metadata corresponding to each one of the views in Views 142. Views Metadata 144 may be used to organize the Views 142 when they are displayed to the user. Some or all of Views Metadata 144 may also be displayed to the user together with Views 142. Most Recent Application Views Repository 140 may be embodied as a group of one or more databases or the like. In some embodiments, Most Recent Application Views Repository 140 is accessed by each one of the user devices through an application programming interface that is stored in Memory 124 and that executes on Processing Circuitry 122, shown for purposes of illustration in FIG. 1 by API 138. In some embodiments, Most Recent Application Views Repository 140 may be accessed by Viewer Application 146 through an application programming interface that is stored in Memory 124 and that executes on Processing Circuitry 122, shown for purposes of illustration in FIG. 1 by API 148. Each one of API 138 and API 148 may, for example, be embodied using a Representational State Transfer (REST) type API.

In some embodiments, API 138 and/or API 148 may be applications within the Hosted Applications 156, and accessed by the user and/or the user devices shown in FIG. 1 through the Virtual Workspace Application 158.

During operation of the components shown in the example of FIG. 1, while the user is using User Device 100, program code executing on User Device 100, e.g. Native Application 128, detects that the user has stopped using Native Application 128. In response to detecting that the user has stopped using Native Application 128, program code executing on the User Device 100 captures Last Task View 134 for Native Application 128. For example, in response to detecting that the user has stopped using Native Application 128, Native Application 128 captures Last Task View 134 and stores Last Task View 134 in Memory 112. Last Task View 134 for Native Application 128 may include the contents of Native Application UI 132 at the time that Native Application 128 detected that the user had stopped using Native Application 128. Last Task View 134 may, for example, consist of or include an image file containing an image of the Native Application UI 132 that is captured by Native Application 128 at the time that Native Application 128 detects that the user had stopped using Native Application 128.

Native Application 128 may be an application that performs multiple tasks, and Last Task View 134 may be an image of the user interface for Native Application 128 showing the last task that was being performed by the user through Native Application 128 when the user stopped using Native Application 128. For example, some electronic mail applications provide one task that allows the user to create an electronic mail message, and another task that allows the user to schedule a meeting. In an example where Native Application 128 is such a multiple task electronic mail application, and where at the time the user stopped using Native Application 128 the user was using Native Application 128 to compose an electronic mail message, Last Task View 134 would be an image of the user interface showing the electronic mail message composition task being performed by Native Application 128 as it existed when the user stopped using Native Application 128. Similarly, where at the time the user stopped using Native Application 128 the user was using Native Application 128 to schedule a meeting, Last Task View 134 would be an image of the user interface showing the meeting scheduling task being performed by Native Application 128 as it existed when the user stopped using Native Application 128. In some embodiments, Native Application 128 may capture Last Task View 134 when it detects that the user switches from a first task to a second task within Native Application 128.

Last Task View 134 is transmitted from User Device 100 to Virtual Workspace Server 108, and then stored into Most Recent Application Views Repository 140, as one of the views within the Views 142 of the user's most recently used applications. For example, Last Task View 134 may be transmitted by Native Application 128 and/or an operating system executing in User Device 100 to the API 138, and API 138 stores Last Task View 134 as one of the views in the Views 142 within the Most Recent Application Views Repository 140.

Views 142 of applications most recently used by the user, including Last Task View 134 for Native Application 128, are output from Most Recent Application Views Repository 140 to Viewer Application 146. For example, Viewer Application 146 may extract Views 142 of applications most recently used by the user from Most Recent Application Views Repository 140 using API 148. Views 142 of applications most recently used by the user are then displayed to the user by Viewer Application 146. For example, Viewer Application 146 may transmit Views 142 of applications most recently used by the user to User Device 106 while the user is using User Device 106, causing Views 142 of applications most recently used by the user to be displayed to the user in Display Device 120 of User Device 106, e.g. within the Virtual Workspace UI 164 that is generated by Virtual Workspace Client Application 160.

In some embodiments, program code executing in User Device 100 (e.g. Native Application 128, and/or an operating system executing in User Device 100) may detect that the user has stopped using Native Application 128 at least in part by detecting that Native Application UI 132 has been moved to a background of GUI 130. In such embodiments, Last Task View 134 for Native Application 128 may include or consist of the contents of Native Application UI 132 at the time when Native Application UI 132 was moved to the background of GUI 130.

In some embodiments, program code executing in User Device 100 (e.g. Native Application 128, and/or an operating system executing in User Device 100) may detect that the user has stopped using Native Application 128 at least in part by detecting that Native Application 128 has been closed, i.e. that the user has closed Native Application 128 on User Device 100. In such embodiments, Last Task View 134 for Native Application 128 may include or consist of the contents of Native Application UI 132 at the time when Native Application 128 was closed on User Device 100.

In some embodiments, further in response to detecting that the user has stopped using the application executing on the user device, program code executing on User Device 100, e.g. Native Application 128, may capture metadata for Native Application 128 that corresponds to Last Task View 134. For example, Native Application 128 may capture the View Metadata 136 corresponding to Last Task View 134 at the time the user stops using Native Application 128.

View Metadata 136 corresponding to Last Task View 134 for Native Application 128 may also be transmitted from User Device 100 to Virtual Workspace Server 108 at the same time that Last Task View 134 is transmitted from User Device 100 to Virtual Workspace Server 108. For example, View Metadata 136 may be transmitted by Native Application 128 and/or an operating system executing in User Device 100 to the API 138, and API 138 stores View Metadata 136 as part of Views Metadata 144 stored in Most Recent Application Views Repository 140.

View Metadata 144, including View Metadata 136 corresponding to Last Task View 134 for Native Application 128, is output from Most Recent Application Views Repository 140 to Viewer Application 146. For example, Viewer Application 146 may extract View Metadata 144 corresponding to the views of the applications most recently used by the user from Most Recent Application Views Repository 140 using API 148.

View Metadata 144 may then be displayed to the user by Viewer Application 146. For example, Viewer Application 146 may transmit View Metadata 144 to User Device 106 while the user is using User Device 106, causing View Metadata 144 to be displayed to the user in Display Device 120 of User Device 106, e.g. within the Virtual Workspace UI 164 that is generated by Virtual Workspace Client Application 160.

Various specific types of metadata corresponding to Last Task View 134 may be captured on User Device 100 and transmitted from User Device 100 to Virtual Workspace Server 108. Examples of such metadata may include, without limitation, metadata identifying Native Application 128, metadata indicating a time at which Native Application 128 was most recently used, metadata identifying User Device 100, and/or various other metadata related to the corresponding last task view.

In some embodiments, Views Metadata 144 may include a set of metadata corresponding to each one of the views in Views 142 of applications most recently used by the user.

Figure 2:
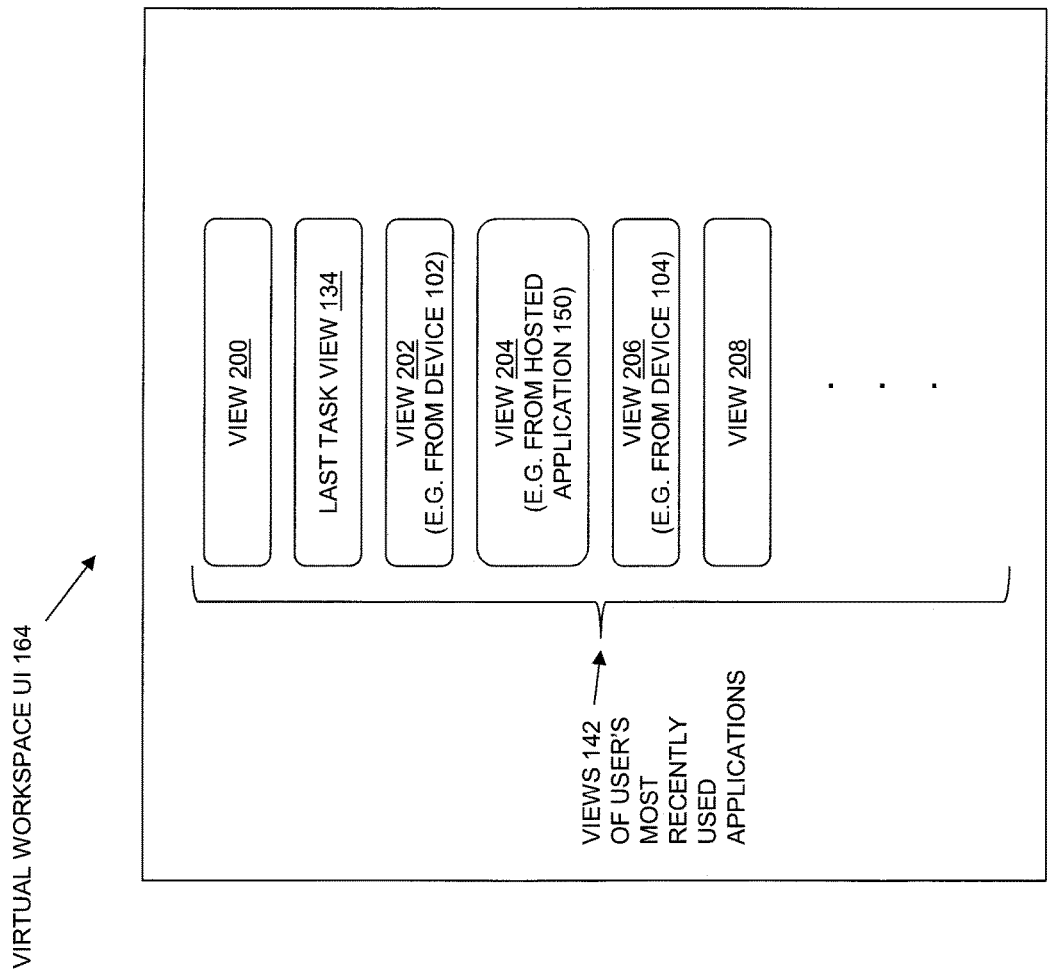
FIG. 2 is a block diagram showing a first example of a user interface provided in some embodiments of the disclosed technology, the user interface displaying the views of applications most recently used by the user to the user.

FIG. 2 is a block diagram showing a first example of Virtual Workspace UI 164 as may be provided by some embodiments of the disclosed technology. The example of Virtual Workspace UI 164 shown in FIG. 2 displays Views 142 of the applications that were most recently used by the user, e.g. while the user is using User Device 106. As shown in the example of FIG. 2, Views 142 of the user's most recently used applications may include views of applications that execute on different user devices and/or computer systems. For example, Views 142 may include a View 200 that is located at a topmost position within a list of views that are displayed to the user, and is followed in the list by the Last Task View 134 that was received by Virtual Workspace Server 108 from User Device 100.

Last Task View 134 is followed in the list by a View 202. View 202 was received by Workspace Server 108 from User Device 102. View 202 is a view (e.g. an image) of the user interface generated by an application executing on User Device 102 as it existed and was captured when that application was last used by the user, e.g. in response to detecting that the user was no longer using the application. For example, User Device 102 may be a desktop or laptop computer, and accordingly View 202 may be a last task view that was captured on a desktop or laptop computer. View 202 may therefore include or consist of the contents of a user interface displayed by an application executing on a desktop or laptop computer, and accordingly may have been captured in response to detecting that the user stopped using an application executing on a desktop or laptop computer.

View 202 is followed in the list by a View 204. View 204 is a view (e.g. an image) of a user interface generated by the Hosted Application 150 (e.g. and displayed within Virtual Workspace UI 164) as it existed and was captured when Host Application 150 was last used by the user, e.g. in response to detecting that the user stopped using the application. Accordingly, View 204 is an example of a last task view that includes or consists of the contents of a user interface of a remotely hosted application (e.g. Hosted Application 150), executing at least in part on a host server (e.g. Virtual Workspace Server 108), that was captured in response to detecting that the user had stopped using the remotely hosted application.

View 204 is followed in the list by a View 206 that was received by Workspace Server 108 from User Device 104, and that is a view (e.g. an image) of the user interface generated by an application executing on User Device 104 as it existed when that application was last used by the user, e.g. as captured in response to detecting that the user stopped using the application. View 204 is followed by a View 206, and then a View 208, and potentially some number of other views.

The order in which the views in Views 142 are listed may be determined by Viewer Application 146 in response to all or some portion of the Views Metadata 144. For example, Views Metadata 144 may include metadata corresponding to each one of the views in Views 142. Viewer Application 146 may organize the Views 142 using an ordering that reflects some or all of the metadata corresponding to each one of the views in Views 142. For example, Views Metadata 144 may include a time that corresponds to each view in Views 142, indicating a time at which the user last used the application that generated the user interface from which the corresponding view was captured (e.g. the time at which the corresponding view was captured). Viewer Application 146 may then order the views in Views 142 in a list based on the time corresponding to each view, e.g. such that views corresponding to more recent times are located closer to the top of the list. In another example, Viewer Application 146 may organize the way the views of Views 142 are displayed based on metadata for each view that identifies the application that generated the user interface from which the view was captured, such that views of the same application (e.g. as captured on different devices) are grouped together. In another example, Viewer Application 146 may organize the way the views of Views 142 are displayed based on metadata for each view that identifies the device on which each view was captured, such that views captured on the same device are grouped together. The preceding examples are not limiting, and Viewer Application 146 may organize the way views of Views 142 are displayed based on any one or more of the various specific types of metadata corresponding to views in Views 142 that may be captured and transmitted to Virtual Workspace Server 108 and stored in Views Metadata 144.

In some embodiments, in response to detecting that the user has selected one of the views in Views 142 within the Virtual Workspace UI 164, e.g. by detecting that the user has clicked on one of the views in Views 142 within the display of Views 142 in the Virtual Workspace UI 164, Viewer Application 146 may change the display of the selected view by causing a larger version of the selected view to be displayed in Virtual Workspace UI 164. For example, Viewer Application 146 may respond to detecting that the user has clicked on the display of Last Task View 134 in Virtual Workspace UI 164 by replacing the original display object for Last Task View 134 in Virtual Workspace UI 164 with a larger display of Last Task View 134, e.g. with a display of Last Task View 134 that is twice as large as the original display of Last Task View 134 within Virtual Workspace UI 164.

In some embodiments, in response to detecting that the user has selected one of the views in Views 142 within the Virtual Workspace UI 164, e.g. by detecting that the user has clicked on one of the views in Views 142 within the display of Views 142 in the Virtual Workspace UI 164, Viewer Application 146 may resume execution of a remotely hosted application on a host server. For example, Viewer Application 146 may respond to detecting that the user has clicked on the display of View 204 in Virtual Workspace UI 164 by resuming execution of Hosted Application 150 on Virtual Workspace Server 108. In such an embodiment, the set of metadata corresponding to View 204 may include information that enables execution of Hosted Application 150 to be resumed. For example, such metadata may include or consist of application configuration information identifying Hosted Application 150, such as an Independent Computing Architecture (ICA) file or the like, as well as an identifier of Virtual Workspace Server 108.

Figure 3:
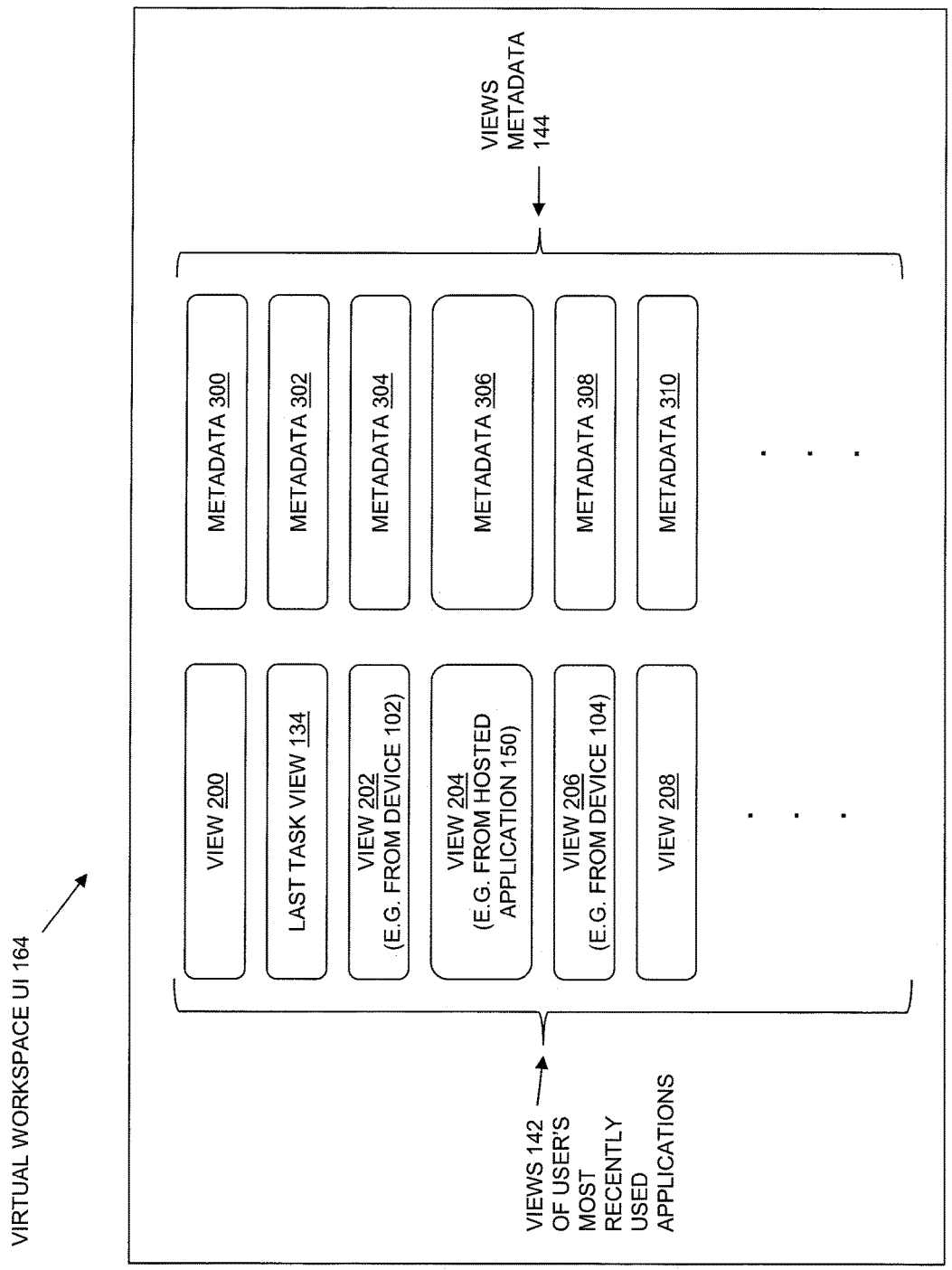
FIG. 3 is a block diagram showing a second example of a user interface provided in some embodiments of the disclosed technology, the user interface displaying the views of applications most recently used by the user together with corresponding metadata.

FIG. 3 is a block diagram showing a second example of Virtual Workspace UI 164 as may be provided by some embodiments of the disclosed technology. The example of Virtual Workspace UI 164 shown in FIG. 3 displays a set of metadata corresponding to each one of the views in Views 142. As shown in the example of FIG. 3, Metadata 300 corresponding to View 200 may be displayed in visual proximity to View 200, Metadata 302 corresponding to Last Task View 134 may be displayed in visual proximity to Last Task View 134, Metadata 304 may be displayed in visual proximity to View 202, Metadata 306 corresponding to View 204 may be displayed in visual proximity to View 204, Metadata 308 corresponding to View 206 may be displayed in visual proximity to View 206, Metadata 310 corresponding to View 208 may be displayed in visual proximity to View 208, and so on for each view in Views 142. The specific positioning of the metadata with regard to the corresponding views in FIG. 3 is provided only for purposes of explanation, and is not limiting. The display of the metadata corresponding to a specific view may be provided in any specific manner that enables the user to visually correlate each set of metadata and the corresponding view. In addition, the display of metadata for one or more corresponding views may be provided with the initial display of Virtual Workspace UI 164, or may be provided after the initial display of Virtual Workspace UI 164, e.g. in response to detecting one or more predetermined user actions, such as the user clicking on a display object such as a menu item, button, and/or one or more individual views within Views 142.

Figure 4:
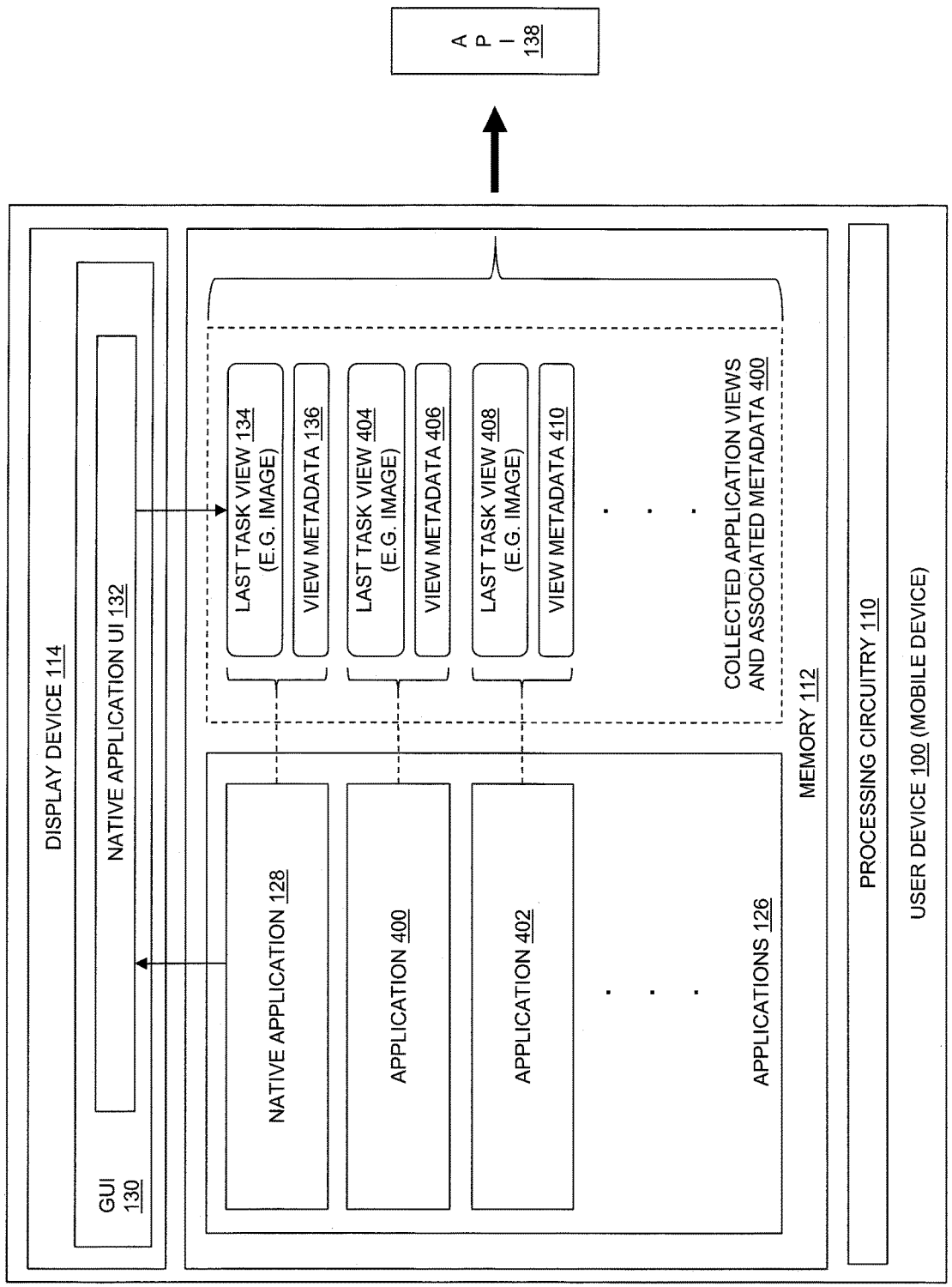
FIG. 4 is a block diagram showing an example of a user device in some embodiments of the disclosed technology, in which a set of multiple last task views are captured on the user device and then later transmitted as a group from the user device to the virtual workspace server.

FIG. 4 is a block diagram showing an example of a user device in some embodiments of the disclosed technology, in which a set of multiple last task views are captured on the user device and then saved for later transmission together as a group (or "batch") of last task views that are transmitted from the User Device 100 to the Virtual Workspace Server 108. In the example of FIG. 4, Native Application 128 is one of multiple applications that execute on User Device 100. In the example of FIG. 4, the multiple applications executing on User Device 100 are shown including an Application 400 and an Application 402. When Last Task View 134 is captured, it is added to a set of previously captured last task views and corresponding sets of metadata shown in FIG. 4 by Collected Application Views and Associated Metadata 400. Whereas Last Task View 134 and corresponding View Metadata 136 correspond to Native Application 128, Collected Application Views and Associated Metadata 400 further includes Last Task View 404 and corresponding View Metadata 406 that correspond to Application 400, and Last Task View 408 and corresponding View Metadata 410 that correspond to Application 402. Whereas Last Task View 134 is an image of the user interface generated Native Application 128 captured in response to detecting that the user has stopped using Native Application 128, Last Task View 404 is an image of a user interface generated by Application 400 and captured in response to detecting that the user has stopped using Application 400, and Last Task View 408 is an image of a user interface generated by Application 402 and captured in response to detecting that the user has stopped using Application 402. Each of the last task views and corresponding metadata in Collected Application Views and Associated Metadata 400 are captured and saved when the user stops using the corresponding application, but are transmitted later together as a group of last task views and corresponding sets of metadata to Virtual Workspace Server 108, e.g. to API 138. This type of batched transmission of groups of last task views and corresponding metadata may be advantageous in terms of optimizing resource utilization, e.g. in terms of battery utilization when User Device 100 is embodied as a mobile device such as a smartphone or tablet. Turning the transmitter of a mobile device on typically incurs a significant cost in terms of battery usage. Accordingly, reducing the number of times the transmitter of a mobile device is turned on will increase the mobile device's battery life. In embodiments in which User Device 100 is a mobile device the battery life of User Device 100 may be improved by turning on the transmitter of User Device 100 only once each time a group of task views and corresponding sets of metadata is transmitted, e.g. in order to transmit all of the last task views and metadata in Collected Application Views and Associated Metadata 400, as opposed to turning on the transmitter of User Device 100 each time a last task view is captured. For example, an operating system of User Device 100 may schedule the timing of when Collected Application Views and Associated Metadata 400 is transmitted to the API 138 on the Virtual Workspace Server 108, e.g. based on the availability of resources in User Device 100 to perform such a transmission. For example, an operating system of User Device 100 may schedule the transmission of groups of last task views and corresponding sets of metadata such as Collected Application Views and Associated Metadata 400 to API 138 in response to detecting that the User Device 100 is about to go into screen saver mode, and/or in response to detecting that the User Device 100 is about to display a lock screen. At such a point in time, the operating system may cause those last task views and corresponding sets of metadata that have not previously been transmitted to be transmitted from User Device 106 to the API 138 of the Virtual Workspace Server 108.

Figure 5:
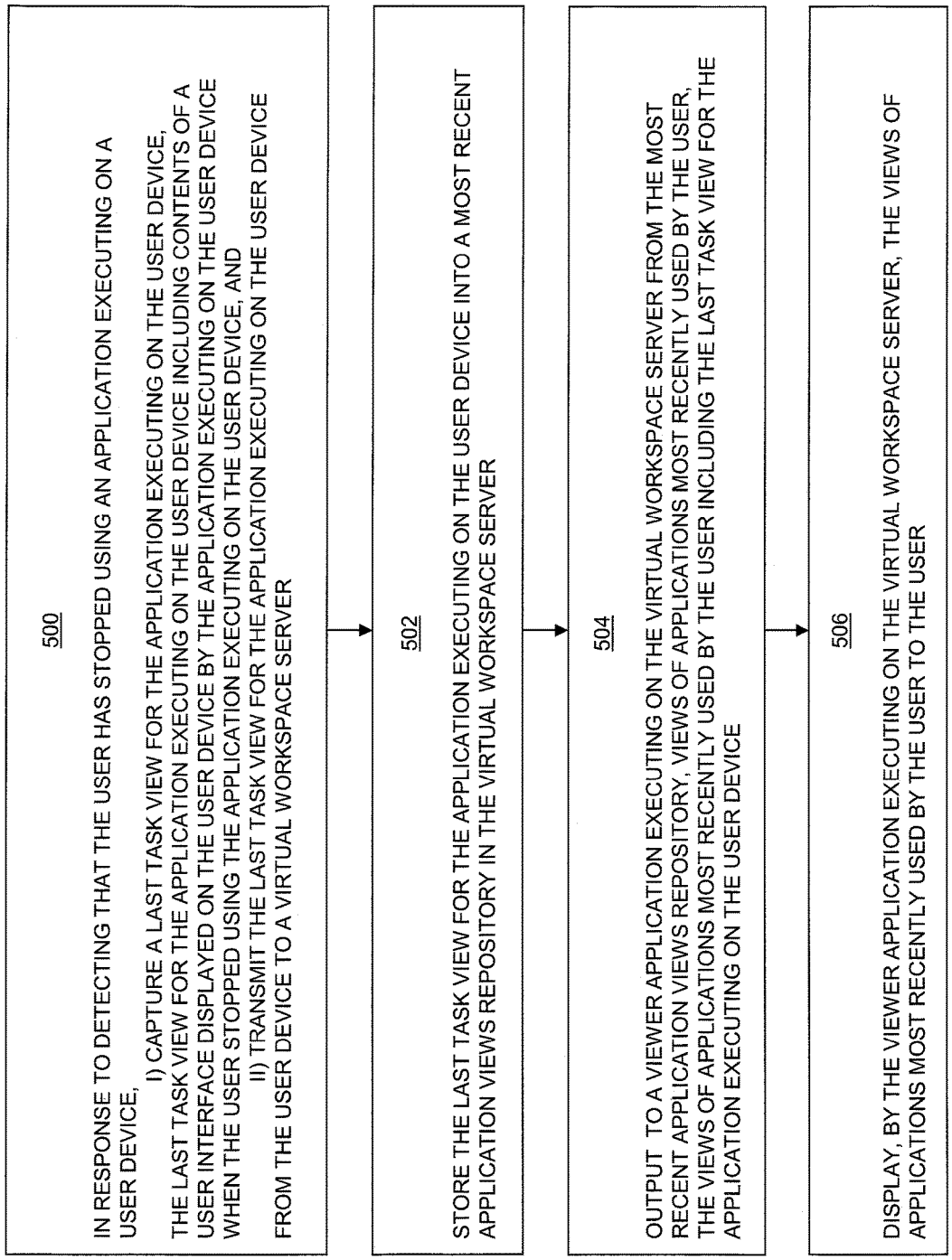
FIG. 5 is a first flow chart illustrating steps performed during operation of some embodiments of the disclosed technology.

FIG. 5 is a first flow chart illustrating steps performed during operation of some embodiments of the disclosed technology. As shown in FIG. 5, at step 500, in response to detecting that the user has stopped using an application executing on a user device, program code executing on the user device captures a last task view for the application executing on the user device. The last task view for the application executing on the user device includes contents of a user interface displayed on the user device by the application executing on the user device when the user stopped using the application executing on the user device. Also at step 500, the last task view for the application executing on the user device is transmitted from the user device to a virtual workspace server.

At step 502, the last task view for the application executing on the user device is stored into a most recent application views repository in the virtual workspace server.

At step 504, views of applications most recently used by the user are output from the most recent application views repository to a viewer application executing on the virtual workspace server. The views of applications most recently used by the user that are output at step 504 include the last task view for the application executing on the user device.

At step 506, the viewer application executing on the virtual workspace server displays the views of applications most recently used by the user to the user.

Figure 6:
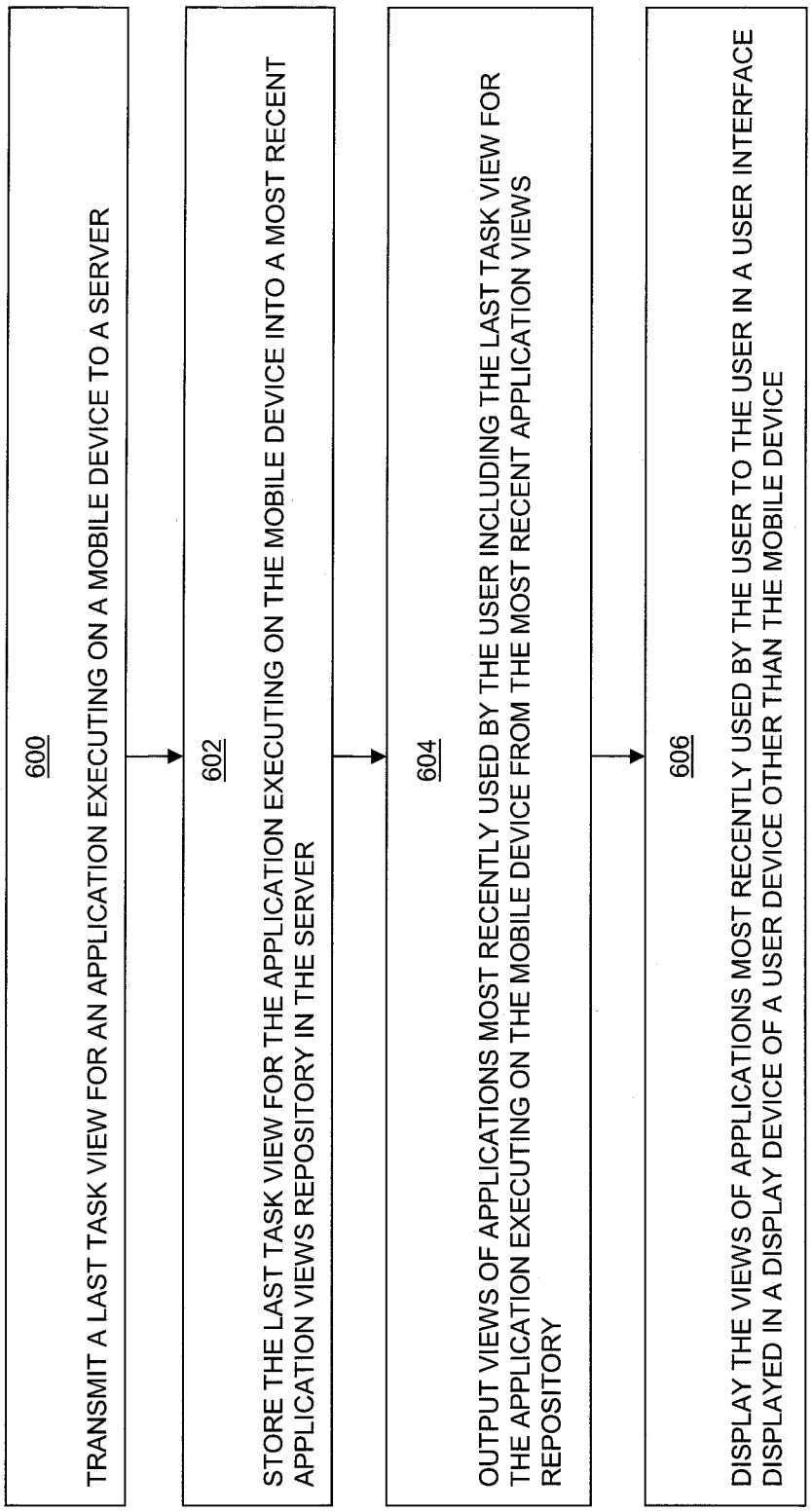
FIG. 6 is a second flow chart illustrating steps performed during operation of some embodiments of the disclosed technology.

FIG. 6 is a second flow chart illustrating steps performed during operation of some embodiments of the disclosed technology.

At step 600 a last task view for an application executing on a mobile device is transmitted to a server.

At step 602 the last task view for the application executing on the mobile device is stored into a most recent application views repository in the server.

At step 604 views of applications most recently used by the user including the last task view for the application executing on the mobile device are output from the most recent application views repository.

At step 606 the views of applications most recently used by the user are displayed to the user in a user interface that is displayed in a display device of a user device other than the mobile device.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

Aspects of the technologies disclosed herein may be embodied as a system, method or computer program product. Accordingly, elements described herein may be embodied using hardware, software (including firmware, resident software, micro-code, etc.) or a combination of software and hardware. Furthermore, functions of the embodiments illustrated herein may take the form of a computer program product embodied at least in part in one or more non-transitory computer readable storage medium(s) having computer readable program code stored thereon for causing one or more processors to carry out those functions.

Any combination of one or more non-transitory computer readable storage medium(s) may be utilized. Examples of a non-transitory computer readable storage medium include, but are not limited to, an optical disc (e.g. CD or DVD), an optical storage device, a magnetic disk, a magnetic storage device, a random access memory (RAM), a read-only memory (ROM), an erasable programmable read-only memory (EPROM or Flash memory), and/or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments. It will be understood that one or more of the block in such figures, and combinations of the blocks, can be implemented by computer program instructions. These computer program instructions may be executed on processing circuitry to form specialized hardware. The computer program instructions may further be loaded onto one or more computing devices to produce a machine, such that the instructions which executed on the computing device(s) create means for implementing the functions specified in the block or blocks. The computer program instructions may also be stored in a computer-readable memory that can direct one or more computing devices to function in a particular manner, such that the instructions stored in the computer-readable memory produce an article of manufacture including instruction means which implement the function specified in the block or blocks. The computer program instructions may also be loaded onto one or more computing devices to cause a series of operational steps to be performed to produce a computer implemented process such that the instructions which execute on the computing device(s) provide steps for implementing the functions specified in the block or blocks.

It will also be understood by those of ordinary skill in the art that modification to and variation of the illustrated embodiments may be made without departing from the inventive concepts described herein.

What is claimed is:

1. A method of providing views of applications most recently used by a user, comprising:

in response to detecting that the user has stopped using an application executing on a user device, i) capturing a last task view for the application executing on the user device, the last task view for the application executing on the user device including contents of a user interface displayed on the user device by the application executing on the user device when the user stopped using the application executing on the user device, and ii) transmitting the last task view for the application executing on the user device from the user device to a server computer;

storing the last task view for the application executing on the user device into a most recent application views repository in the server computer;

outputting, to a viewer application executing on the server computer from the most recent application views repository, a plurality of views of applications most recently used by the user, the views of applications most recently used by the user including the last task view for the application executing on the user device; and displaying, by the viewer application executing on the server computer, the views of applications most recently used by the user to the user.

2. The method of claim 1, wherein the user device comprises a mobile device;

wherein the application executing on the user device comprises a native application executing on the mobile device; and wherein the last task view of the application executing on the user device comprises an image captured of the user interface displayed on a display device of the mobile device by the native application executing on the mobile device when the user stopped using the native application executing on the mobile device.

3. The method of claim 2, wherein displaying, by the viewer application executing on the server computer, the views of applications most recently used by the user to the user, further comprises:

transmitting the views of applications most recently used by the user from the server computer to a user device other than the mobile device; and displaying the views of applications most recently used by the user in a user interface displayed in a display device of the user device other than the mobile device.

4. The method of claim 1, wherein detecting that the user has stopped using the application executing on the user device comprises detecting that the user interface of the application executing on the user device has been moved to a background of a graphical user interface displayed in a display device of the user device; and wherein the last task view for the application executing on the user device comprises contents of the user interface displayed by the application executing on the user device when the user interface of the application executing on the user device was moved to the background of the graphical user interface displayed in the display device of the user device.

5. The method of claim 1, wherein detecting that the user has stopped using the application executing on the user device comprises detecting that the application executing on the user device has been closed; and wherein the last task view for the application executing on the user device comprises contents of the user interface displayed by the application executing on the user device when the application executing on the user device was closed.

6. The method of claim 1, further comprising:

further in response to detecting that the user has stopped using the application executing on the user device, i) capturing metadata corresponding to the last task view for the application executing on the user device, and ii) transmitting the metadata corresponding to the last task view for the application executing on the user device to the server computer;

storing the metadata corresponding to the last task view for the application executing on the user device in the most recent application views repository in the server computer; and outputting the metadata corresponding to the last task view for the application executing on the user device from the most recent application views repository in the server computer to the viewer application executing on the server computer.

7. The method of claim 6, wherein displaying, by the viewer application executing on the server computer, the views of applications most recently used by the user includes displaying the metadata corresponding to the last task view for the application executing on the user device.

8. The method of claim 6, wherein the metadata includes metadata identifying the application executing on the user device.

9. The method of claim 6, wherein the metadata includes metadata indicating a time at which the application executing on the user device was most recently used.

10. The method of claim 6, wherein the metadata includes metadata identifying the user device.

11. The method of claim 6, further comprising:
wherein the most recent application views repository stores metadata corresponding to each one of the views of applications most recently used by the user; and
wherein displaying, by the viewer application executing on the server computer, the views of applications most recently used by the user includes i) organizing the views of applications most recently used by the user according to the metadata corresponding to each of the views of applications most recently used by the user, and ii) displaying the views of applications most recently used by the user as organized according to the metadata corresponding to each of the views of applications most recently used by the user.

12. The method of claim 1, wherein displaying the views of applications most recently used by the user further includes:
detecting user selection of one of the views of applications most recently used by the user; and
in response to detecting user selection of one of the views of applications most recently used by the user, displaying a larger version of the selected one of the views of applications most recently used by the user.

13. The method of claim 1, further comprising:
capturing a plurality of last task views on the user device, each one of the last task views captured on the user device including contents of a user interface of a corresponding application executing on the user device when the user stopped using the corresponding application;
transmitting the plurality of last task views captured on the user device together as a group from the user device to the server computer; and
wherein the views of applications most recently used by the user include the plurality of last task views captured on the user device.

14. The method of claim 2, wherein the views of applications most recently used by the user further includes at least one last task view captured on a desktop computer; and
wherein the last task view captured on the desktop computer includes contents of a user interface displayed by an application executing on the desktop computer and captured when the user stopped using the application executing on the desktop computer.

15. The method of claim 14, wherein the views of applications most recently used by the user further includes at least one last task view including contents of a user interface of a remotely hosted application executing at least in part on a host server and captured when the used stopped using the remotely hosted application; and wherein displaying the views of applications most recently used by the user further includes:
in response to detecting user selection of the last task view including contents of the user interface of the remotely hosted application captured when the used stopped using the remotely hosted application, resuming execution of the remotely hosted application on the host server.

16. The method of claim 1, wherein the server computer comprises a virtual workspace server, and further comprising:
executing a virtual workspace application on the virtual workspace server, wherein the virtual workspace application provides a virtual workspace user interface to the user; and wherein the viewer application executing on the virtual workspace server is accessed by the user through the virtual workspace application.

17. A computer program product, comprising:
a non-transitory computer readable medium which stores program code for providing views of applications most recently used by a user, the program code, when executed by processing circuitry, causing the processing circuitry to perform a method of:
in response to detecting that the user has stopped using an application executing on a user device, i) capturing a last task view for the application executing on the user device, the last task view for the application executing on the user device including contents of a user interface displayed on the user device by the application executing on the user device when the user stopped using the application executing on the user device, and ii) transmitting the last task view for the application executing on the user device from the user device to a server computer;
storing the last task view for the application executing on the user device into a most recent application views repository in the server computer;
outputting, to a viewer application executing on the server computer from the most recent application views repository, a plurality of views of applications most recently used by the user, the views of applications most recently used by the user including the last task view for the application executing on the user device; and
displaying, by the viewer application executing on the server computer, the views of applications most recently used by the user to the user.

18. A system for providing views of applications most recently used by a user, comprising:
at least one server computer, comprising processing circuitry and memory storing program code that is executable on the processing circuitry of the server computer and a most recent application views repository;
a user device, comprising processing circuitry and memory, the memory storing program code that is executable on the processing circuitry of the user device;
wherein the program code stored in the memory of the user device, when executed on the processing circuitry of the user device, causes the user device to:
in response to detecting that the user has stopped using an application executing on a user device, i) capture a last task view for the application executing on the user device, the last task view for the application executing on the user device including contents of a user interface displayed on the user device by the application executing on the user device when the user stopped using the application executing on the user device, and ii) transmit the last task view for the application executing on the user device from the user device to the server computer; and
wherein the program code stored in the memory of the server computer, when executed on the processing circuitry of the server computer, causes the server computer to:
store the last task view for the application executing on the user device into the most recent application views repository,
output, to a viewer application executing on the virtual workspace server from the most recent application views repository, a plurality of views of applications most recently used by the user, the views of applications most recently used by the user including the last task view for the application executing on the user device, and display, by the viewer application executing on the server computer, the views of applications most recently used by the user to the user.

\* \* \* \* \*